United States Patent
Meyer et al.

(10) Patent No.: US 7,263,855 B2
(45) Date of Patent: Sep. 4, 2007

(54) CARGO CONTAINER FOR TRANSPORTING TEMPERATURE SENSITIVE ITEMS

(75) Inventors: Chris E. Meyer, Xenia, OH (US);
Michael A. Sieron, Dayton, OH (US);
Nicholas Wynne, Hilliard, OH (US)

(73) Assignee: DoubleDay Acquisitions, LLC, Dayton, OH (US)

( * ) Notice: Subject to any disclaimer, the term of this patent is extended or adjusted under 35 U.S.C. 154(b) by 273 days.

(21) Appl. No.: 11/147,564

(22) Filed: Jun. 8, 2005

(65) Prior Publication Data

US 2006/0277938 A1  Dec. 14, 2006

(51) Int. Cl.
*F25D 3/08* (2006.01)
*F25B 21/00* (2006.01)

(52) U.S. Cl. ........................................ 62/371; 62/457.9
(58) Field of Classification Search ................. 62/126, 62/371, 419, 457.9; 220/592.09, 592.1; 312/236, 406; 428/69, 71
See application file for complete search history.

(56) References Cited

U.S. PATENT DOCUMENTS

| | | | |
|---|---|---|---|
| 3,889,486 A * | 6/1975 | Hinckley et al. ............. 62/62 |
| 4,276,752 A * | 7/1981 | Modler et al. ................ 62/166 |
| 5,187,945 A | 2/1993 | Dixon | |
| 5,483,799 A | 1/1996 | Dalto | |
| 5,603,220 A | 2/1997 | Seaman | |
| 5,943,876 A | 8/1999 | Meyer et al. | |
| 5,950,450 A | 9/1999 | Meyer et al. | |
| 6,016,664 A * | 1/2000 | Larsson et al. ............... 62/406 |
| 6,192,703 B1 * | 2/2001 | Salyer et al. ................ 62/457.7 |
| 6,226,997 B1 * | 5/2001 | Vago ........................... 62/130 |
| 6,237,361 B1 | 5/2001 | Broussard | |
| 6,244,458 B1 * | 6/2001 | Frysinger et al. ...... 220/592.09 |
| 6,308,518 B1 * | 10/2001 | Hunter ........................ 62/3.3 |
| 6,584,797 B1 * | 7/2003 | Smith et al. ................. 62/371 |
| 6,623,413 B1 | 9/2003 | Wynne | |
| 6,740,381 B2 | 5/2004 | Day et al. | |
| 6,860,115 B2 | 3/2005 | Norelius et al. | |
| 6,938,968 B2 * | 9/2005 | Tanimoto et al. .......... 312/406 |

(Continued)

FOREIGN PATENT DOCUMENTS

EP     0781714 A1 *   7/1997

OTHER PUBLICATIONS

Energy Storage Technologies, Inc. "AcuTemp Packaging, Thermal Pallet Shipper" Jun. 2003.

*Primary Examiner*—Mohammad M. Ali
(74) *Attorney, Agent, or Firm*—Jacox, Meckstroth & Jenkins (57) ABSTRACT

A cargo container includes an outer aluminum housing having side, rear, bottom and top walls and a front opening with a pair of hinged doors. The housing receives a molded box-shaped composite outer shell which receives a molded box-shaped composite inner shell defining a cargo chamber. Corresponding walls of the inner and outer shells and the doors confine insulation cassettes each including vacuum insulation panels forming layers separated by a foam sheet and covered by corrugated plastic sheets, all wrapped with plastic film. Air is circulated within the chamber through a refrigeration evaporator and electrical heating elements, and a rear portion of the housing encloses a refrigeration compressor, storage batteries and a control system which senses the temperature within the chamber to operate the compressor and heating element from the batteries or an external power source to maintain substantially constant preselected temperatures within the chamber.

41 Claims, 7 Drawing Sheets

U.S. PATENT DOCUMENTS

| | | |
|---|---|---|
| 6,968,711 B2 * | 11/2005 | Smith et al. .................. 62/371 |
| 2004/0058119 A1 * | 3/2004 | Wynne ........................ 428/69 |
| 2004/0180176 A1 * | 9/2004 | Rusek, Jr. .................... 428/69 |
| 2004/0226309 A1 * | 11/2004 | Broussard .................... 62/236 |

* cited by examiner

CARGO CONTAINER FOR TRANSPORTING TEMPERATURE SENSITIVE ITEMS

BACKGROUND OF THE INVENTION

In the transporting or shipment of temperature sensitive materials or items such as blood, plasma, vaccines and certain drugs, it is known to use insulated containers which include heating and/or cooling means as disclosed, for example in U.S. Pat. Nos. 5,483,799 and 5,603,220 and in U.S. Pat. Nos. 5,950,450 and 5,943,876 assigned to the assignee of the present invention and the disclosures of which are herein incorporated by reference. When it is desirable to transport or ship a larger volume of temperature sensitive items, it is desirable to provide a cargo container which is adapted to receive a pallet supporting the temperature sensitive items and which also includes cooling and/or heating means for maintaining the temperature sensitive items within a close predetermined temperature range. Such cargo containers are disclosed, for example, in U.S. Pat. Nos. 5,187,947, 6,860,115 and in a publication of applicants entitled AcuTemp™ Thermal Pallet Shipper. A Temperature-Controlled, Pallet-Sized Shipping Container is also disclosed in U.S. patent application Ser. No. 2004/0226309, published Nov. 18, 2004, and the disclosure of which is herein incorporated by reference. This published application claims the benefit of provisional application Ser. No. 60/447,987 filed Feb. 17, 2003 by four co-inventors including co-inventors of the present invention, and the disclosure of which is herein incorporated by reference.

In any such cargo container adapted to receive one or more pallets of temperature sensitive items, it is highly desirable for the container to have all walls and the doors with high thermal insulation or R value while minimizing the thickness of the walls in order to maximize the cargo space and minimize heat transfer to and from the container chamber. It is also desirable to provide efficient construction and assembly of the cargo container while providing substantial durability so that the cargo container has an extended service life. It is further desirable for temperature controlled air to be properly circulated within the cargo chamber in order to obtain a uniform temperature throughout the chamber. Preferably, the circulating air passes upwardly through a refrigeration evaporator and electrical heating elements and circulates along the walls of the container for precisely controlling the temperature within the cargo chamber.

In order for a cargo chamber to hold a narrow predetermined temperature range for an extended period of time, for example, over 90 hours, without an external power supply, it is necessary for the cargo container to carry storage batteries which may operate a refrigeration compressor or an electrical heating element through a control system which senses the temperature within the cargo chamber at predetermined locations. The heating element for the circulating air is sometimes desirable when the cargo container is being transported in a cold temperature zone or by an aircraft flying at a high altitude, and the container is exposed to very cold environmental air.

SUMMARY OF THE INVENTION

The present invention is directed to an improved cargo container assembly which provides all of the desirable features mentioned above including high thermal insulation with a relatively thin wall construction. The container may also be efficiently produced and provides substantial durability and a high strength/weight ratio so that the container may be conveniently handled by forklift trucks without losing its high thermal insulation against heat transfer into and out of the container chamber which receives the cargo or items to be transported.

In accordance with one embodiment of the invention, a cargo container generally includes a rigid outer housing which may be a sheet aluminum shell or can having opposite side walls connected by a bottom wall, a rear wall and a removable top wall, and with a front or side opening normally closed by hinged door assemblies. When the top wall of the housing is removed, the housing receives a sub-assembly which includes a box-like molded composite outer shell having a front opening and enclosing a box-like molded composite inner shell also having a front opening. The corresponding side, top, bottom and rear walls of the inner and outer shells confine therebetween flat panel insulation cartridges or cassettes. Each cassette includes two or more layers of vacuum insulation panels which may be separated by a foam insulation sheet and sandwiched between corrugated protective plastic sheets, all of which are wrapped within a plastic film.

A wall of the inner shell supports a refrigeration evaporator, an electrical heating element and circulating fans, all protected by a composite inner wall panel which provides for air circulation within the cargo chamber through the evaporator and heating element. The corresponding wall of the outer shell has a rectangular projection which supports a refrigeration compressor and storage batteries, and a control system senses the temperature within the chamber in different areas to operate the compressor and heating element from the batteries or an external power source in order to maintain a substantial constant preselected temperature within the chamber. A compartment of the housing encloses the compressor, storage batteries and control system.

Other features and advantages of the invention will be apparent from the following description, the accompanying drawings and the appended claims.

DESCRIPTION OF ONE EMBODIMENT

Figure 1:
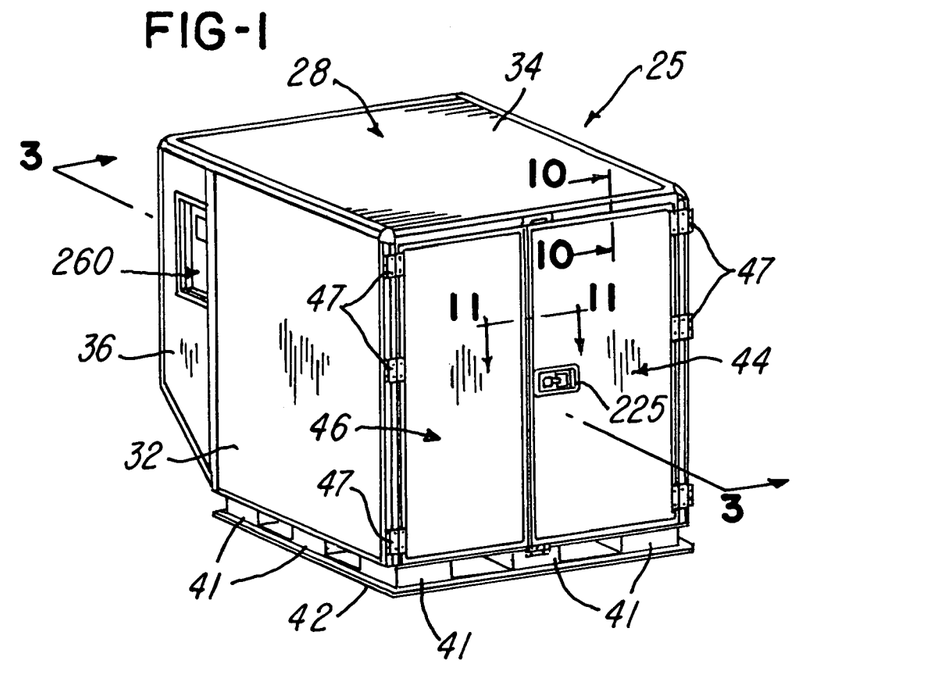
FIG. 1 is a perspective view of a cargo container constructed in accordance with the invention and with the doors in their closed position.
Figure 2:
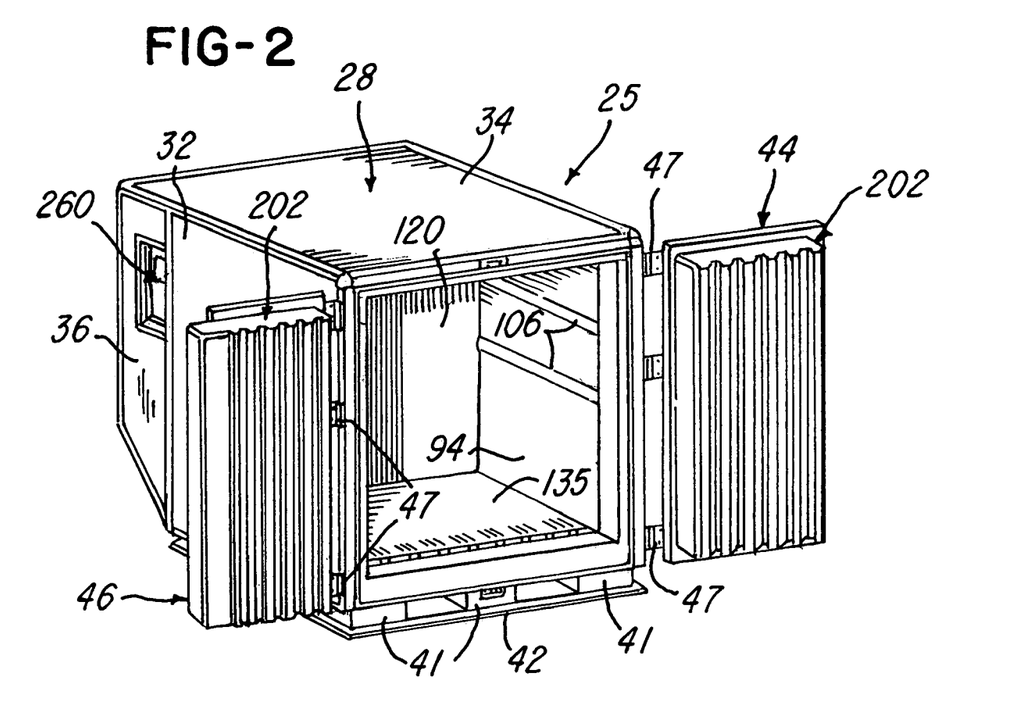
FIG. 2 is a perspective view of the cargo container shown in FIG. 1 and with the doors shown in their open positions.
Figure 3:
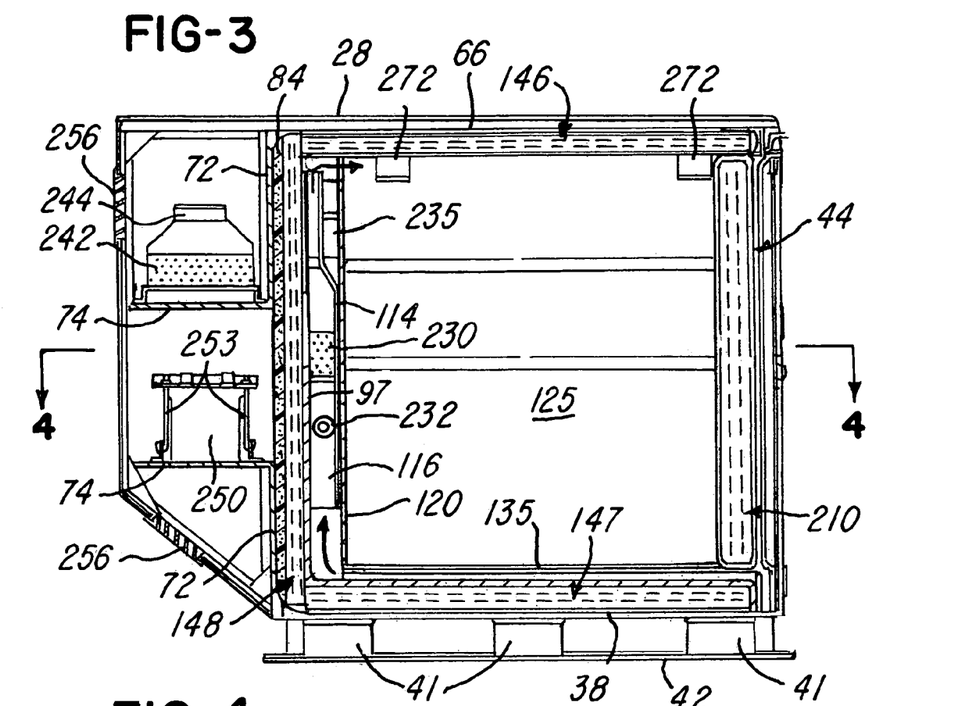
FIG. 3 is a vertical section through the cargo container, taken generally on the line 3-3 of FIG. 1.

Referring to FIG. 1, a cargo container 25 includes an outer housing 28 which is formed of sheet aluminum and aluminum corner trim and sometimes referred to as a "can". The housing 28 includes opposite side walls 32, a removable top wall 34, a rear wall enclosure 36 and a bottom wall 38 (FIG. 3). The housing 28 is supported by a set of hollow aluminum supports or legs 41 connected by an aluminum base plate 42, and the spaced legs 41 are arranged to allow a two or three way entry under the cargo housing 28 with a forklift truck. The transporting of the container 25 may be over the road (OTR) by trucks or rail or may be transported as a unit loading device (ULD) by a ship or aircraft. The housing 28 also supports a pair of swinging door units or assemblies 44 and 46 (FIGS. 1 & 2) each supported by a set of hinges 47 attached to the housing.

Figure 5:
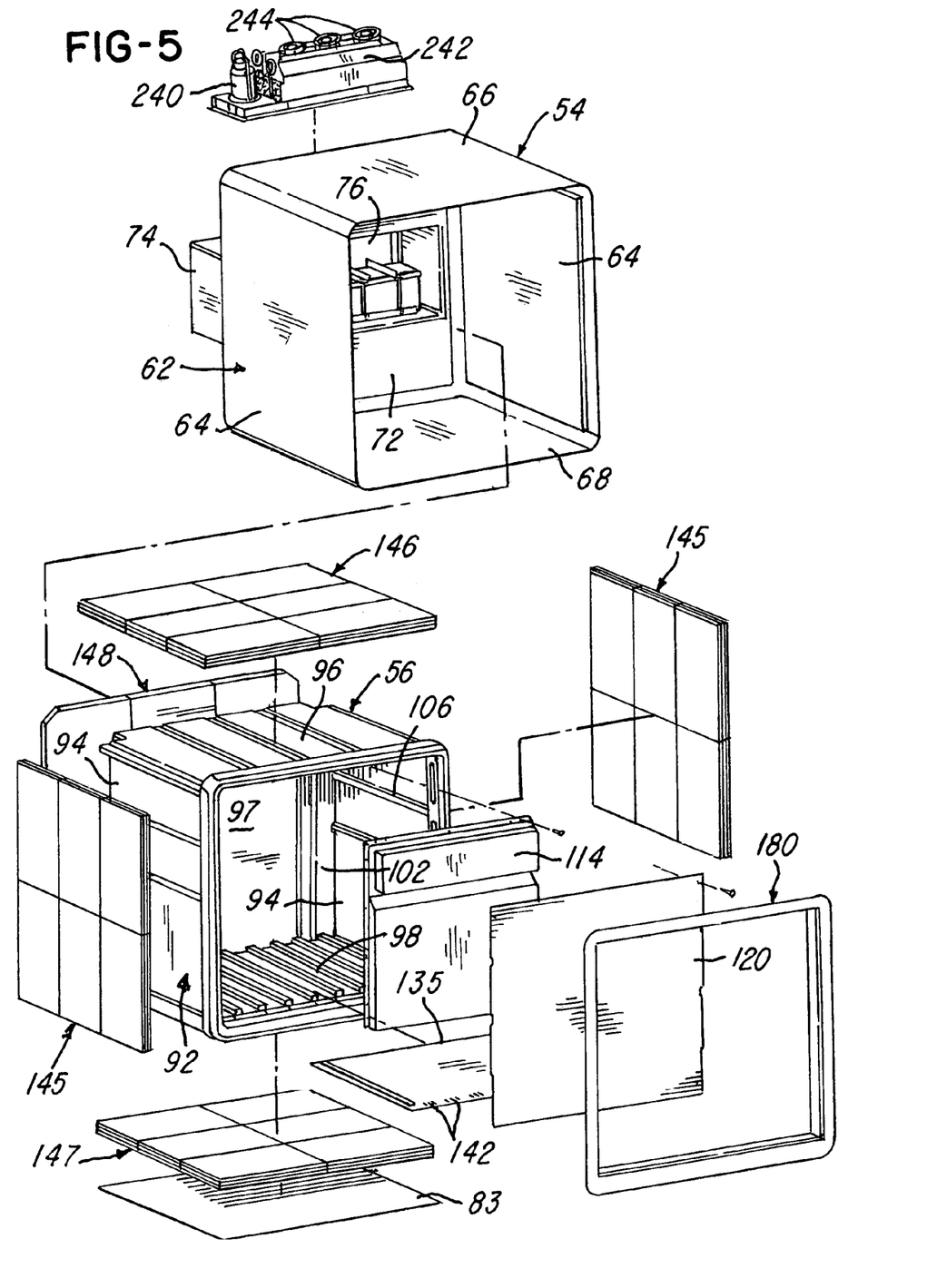
FIG. 5 is an exploded perspective view of a shell sub-assembly which is inserted into the outer housing assembly shown in FIG. 1 and which supports operating components.
Figure 6:
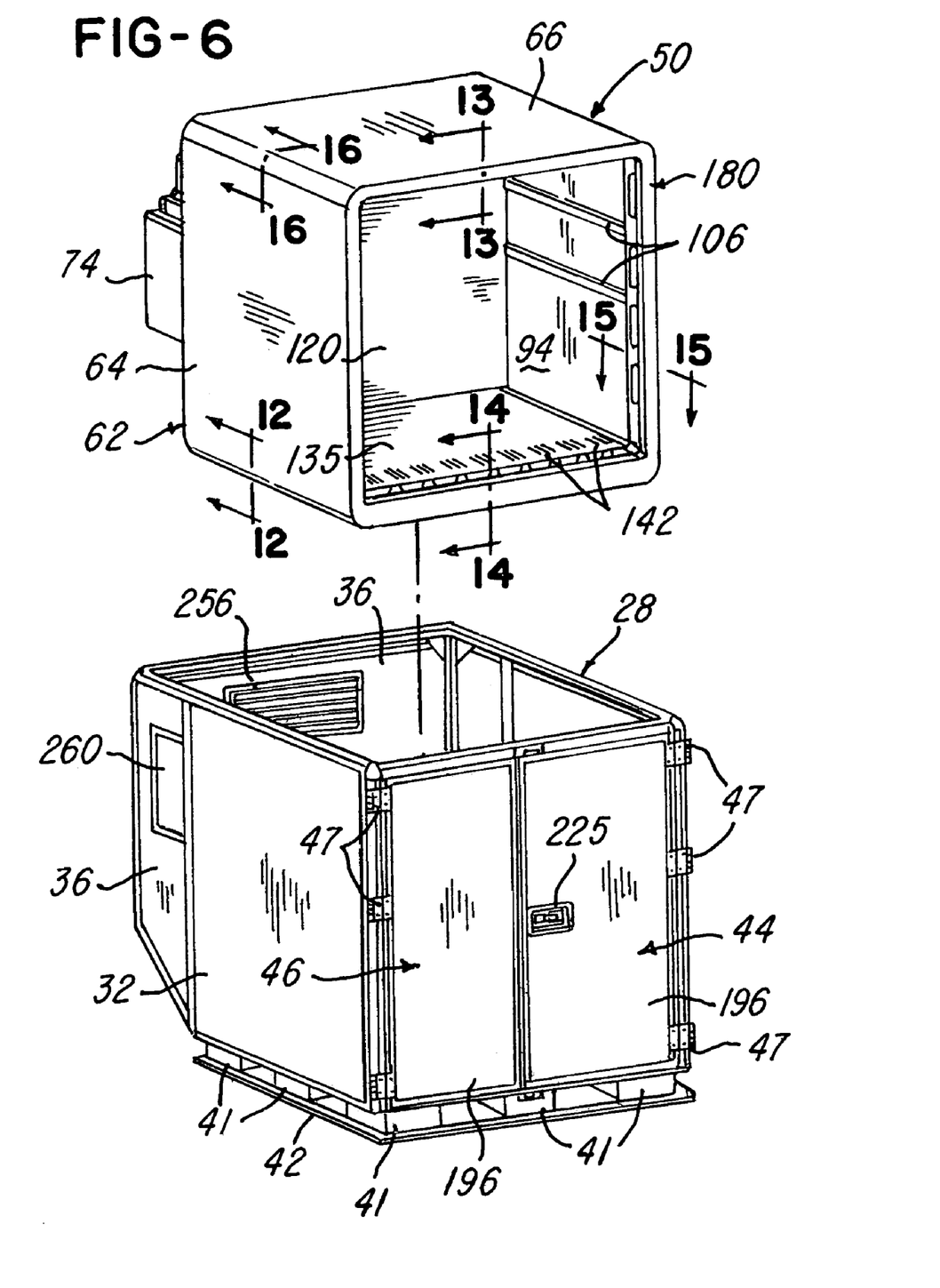
FIG. 6 is an exploded perspective view of the shell sub-assembly before being inserted into the outer housing assembly.

Referring to FIG. 6, before the top wall 34 of the housing is installed, the housing 28 receives a shell sub-assembly 50 which includes a molded composite box-like outer shell 54 (FIGS. 5 & 6) and a molded composite box-like inner shell 56, shown exploded in FIG. 5. Each of the shells 54 and 56 is molded as a one-piece unit, and the outer shell 54 includes a resin impregnated fiber reinforced outer skin 62 which forms opposite side walls 64 (FIG. 5) integrally connected by a top wall 66 and a bottom wall 68 (FIG. 5). The outer shell 54 also has an integrally molded rear wall 72, and an integrally molded tubular support 74 projects rearwardly from the rear wall 72 of the outer shell 54. The tubular or hollow support 74 has a rectangular configuration with a rear opening 76.

The molded fiber reinforced side walls 64, rear wall 72, projecting support 74 and the bottom wall 68 are also molded with fiber reinforced panels 82 and 83 (FIG. 12) and 84 (FIG. 3) which provide substantial additional strength and impact resistance to the outer shell 54. Preferably, the fiber reinforced panels 82-84 are formed from fiber reinforced core panels produced as disclosed in U.S. Pat. No. 6,740,381, the disclosure of which is herein incorporated by reference. The molding of the composite outer shell 54 may be performed by vacuum assisted resin transfer molding (RTM) so that the resin penetrates the fibrous fabric forming the outer skin 62 of the shell 54 and also simultaneously penetrates the fibers within the fiber reinforced core panels 82-84 having inner skins and integral with the outer skin 62.

Figure 4:
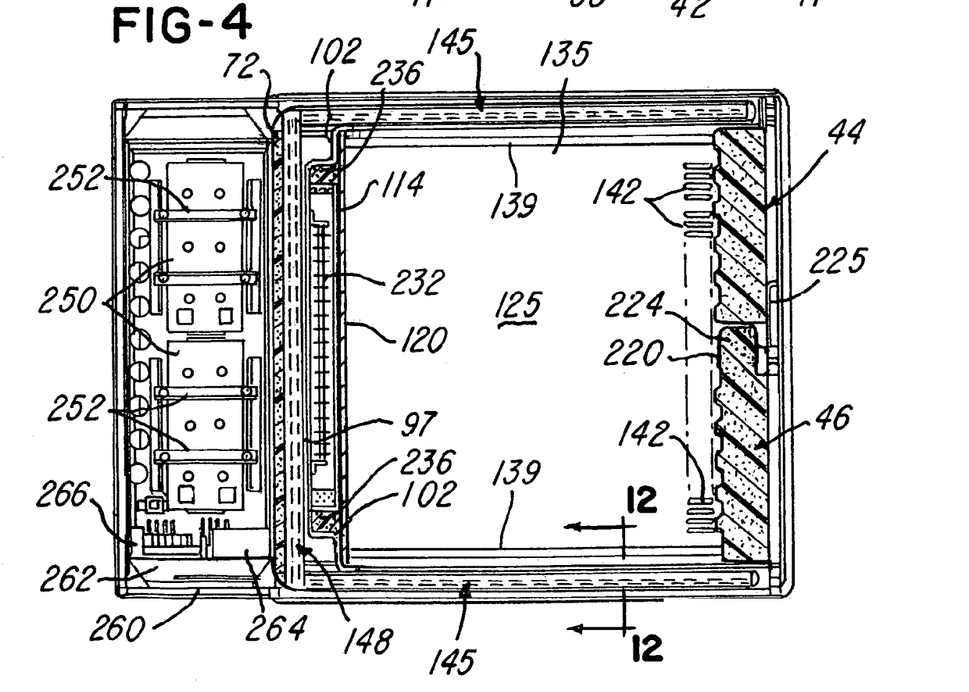
FIG. 4 is a horizontal section of the container, taken generally on the line 4-4 of FIG. 3.
Figure 12:
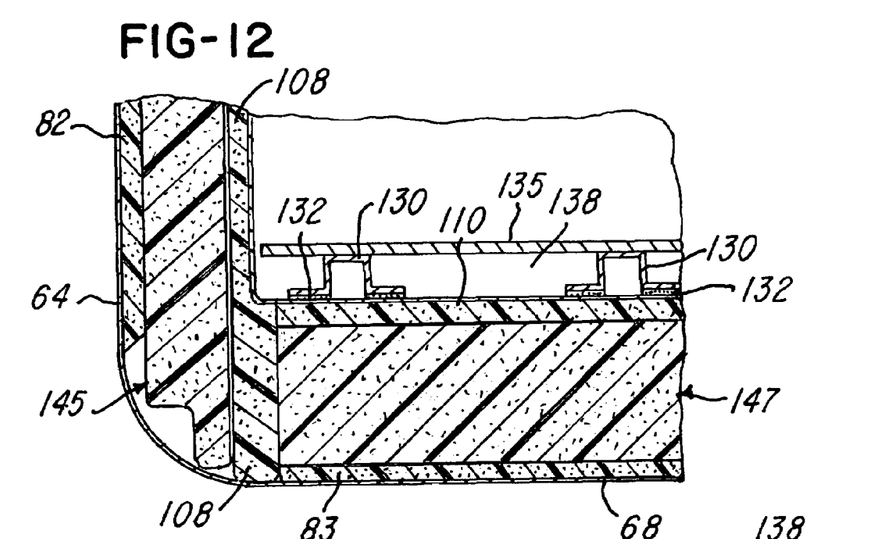
FIG. 12 is a fragmentary corner section of the shell sub-assembly, taken generally on the line 12-12 of FIG. 6.
Figure 13:
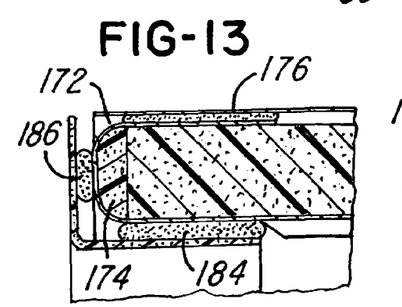
FIG. 13 is a fragmentary section of the shell sub-assembly, taken generally on the line 13-13 of FIG. 6.

As mentioned above, the shell sub-assembly 50 also includes a composite box-like inner shell 56 (FIG. 5) which is molded in the same manner as the outer shell 54 and includes a one-piece fiber reinforced inner skin 92 (FIG. 5) which forms opposite side walls 94, a top wall 96, a rear wall 97 (FIGS. 4 & 5) and a bottom wall 98 (FIG. 12). All of the walls are integrally connected, and the rear wall 97 is provided with integrally molded co-planar step portions 102 (FIG. 4). The side walls 94 are molded with vertically spaced horizontal reinforcing ribs 106, and the lower portions of the side walls 94 and the bottom wall 98 are also molded with fiber reinforced core panels 108 and 110, respectively, which are resin impregnated with the inner skin 92 and formed in the same manner as the outer core panels 82-84. The fiber reinforced core panels have a thickness of about ½ inch, and after the resin hardens, the reinforced panels provide the walls of the outer shell 54 and the lower portion of the inner shell 56 with substantial rigidity and impact strength, as described in above mentioned U.S. Pat. No. 6,740,381.

Referring to FIGS. 3 and 5, an aluminum or molded fiber reinforced partition or panel 114 has an open top and open bottom and is attached to the rear wall 97 of the inner shell 56 to define an upward flow air passage 116 adjacent the rear wall 97. A molded fiber reinforced flat panel 120 having a fiber reinforced core as described above, is attached to the step portions 102 of the rear panel 97 and cooperates with the side walls 94, top wall 96 and bottom wall 98 of the inner shell 56 to define a cargo receiving chamber 125. The volume of the chamber 125 may be on the order of 30 or 45 or 60 or 90 cubic feet, and is sufficiently large to receive a standard size pallet. The composite cold wall flat panel 120 is vertically reinforced, for example, by having vertical fibrous webs in the fiber reinforced core to provide the panel 120 with additional strength.

Figure 14:
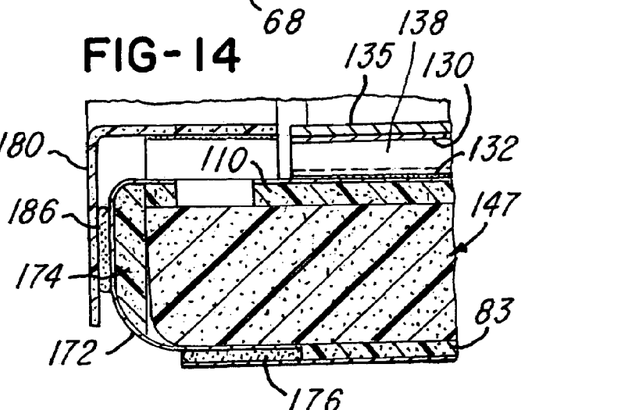
FIG. 14 is a fragmentary section of the shell sub-assembly, taken generally on the line 14-14 of FIG. 6.
Figure 15:
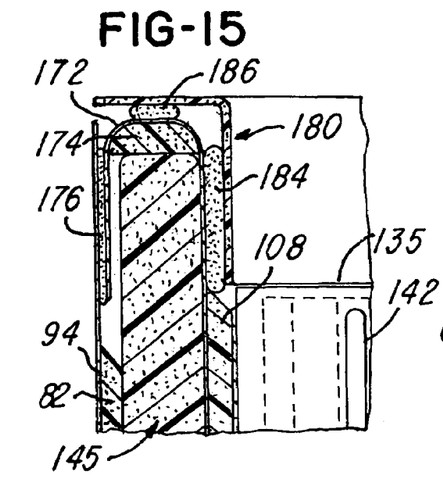
FIG. 15 is a fragmentary section of the shell sub-assembly, taken generally on the line 15-15 of FIG. 6.

As shown in FIGS. 5 and 12, a series of laterally spaced channels 130 are molded as part of the bottom wall 98 or are attached to the bottom wall 98 of the inner shell 56 by adhesive 132, and the channels 130 support a substantially flat aluminum floor panel or plate 135 having a thickness of about ⅛ inch. The floor plate 135 (FIGS. 12 & 14) extends from the front opening of the inner shell 56 to the cold wall 120 to partition the inner cargo receiving chamber 125 from sub-floor air channels or passages 138. The sub-floor channels 130 extend from the front opening of the inner shell 56 to its rear wall 97, to create the air return passages 138 under floor plate 135 together with the inner shell floor 98 (FIG. 5). These passages connect the return air flow from the bottom front of the inner shell 56 to the upward flow air passage 116 (FIG. 3) for the evaporator/heater assembly. The sides of the floor plate 135 are provided with upwardly facing tie-down seat channels 139 (FIG. 4) for receiving straps or nets extending over the cargo. The forward edge portion of the floor plate 135 has a series of parallel spaced slots 142 (FIG. 4) which connect with the air flow passages 138. As shown in FIG. 3, the rearward ends of the passages 138 are open and provide for air flow from the passages upwardly into the chamber 116 defined by the panel 114.

Figure 8:
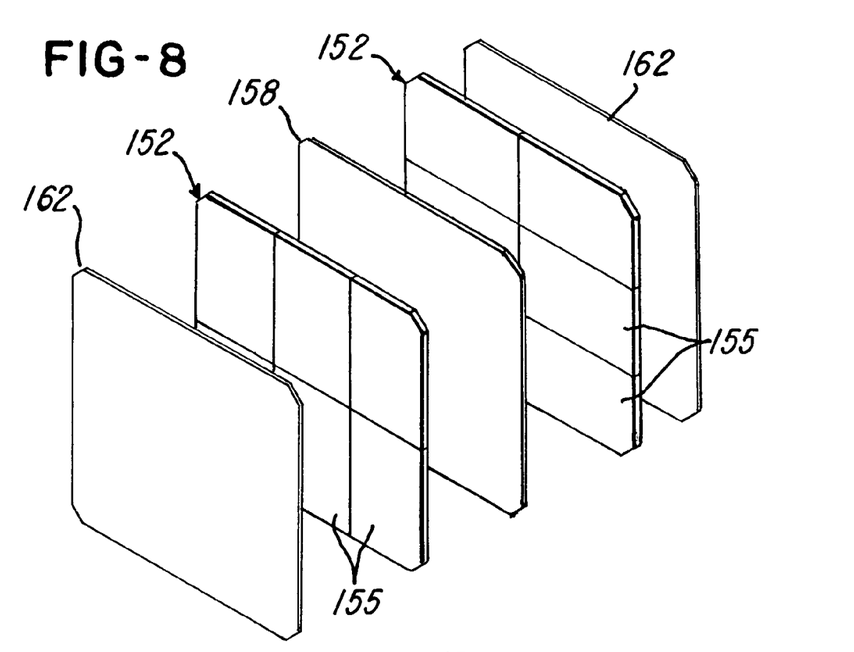
FIG. 8 is an exploded view of an insulation cartridge or cassette used in the walls of the shell sub-assembly and in the door assembly, as shown in FIGS. 5 and 7.
Figure 9:
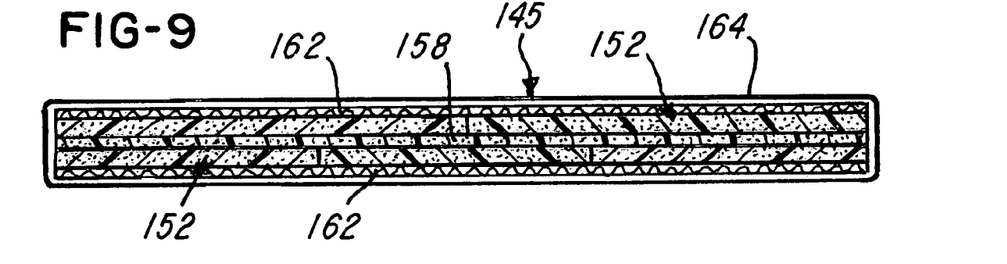
FIG. 9 is a cross-section of an assembled insulation cassette shown exploded in FIG. 8.
Figure 10:
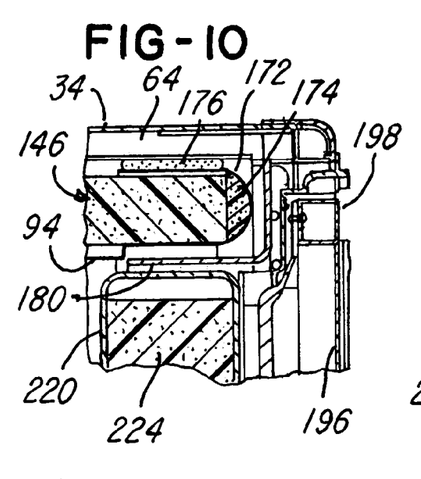
FIG. 10 is a fragmentary corner section of the top wall and door assembly of the cargo container, taken generally on the line 10-10 of FIG. 1.

Referring to FIGS. 5, 8 and 9, a set of flat panel thermal insulation cartridges or cassettes 145, 146, 147 and 148 are confined or sandwiched between the walls of the outer shell 54 and the inner shell 56. As shown in FIGS. 8 and 9, each of the insulation cassettes 145-148 includes a plurality of at least two panels or layers 152 each including a plurality of six vacuum insulation panels 155. Each of the panels 155 is constructed substantially as disclosed in U.S. Pat. No. 6,623,413, assigned to the assignee of the present invention and the disclosure of which is herein incorporated by reference. As generally disclosed in the patent, each of the panels 155 includes a core of porous material enclosed within a bag of gas impermeable film. After the bag is evacuated, the bag is sealed to form a vacuum insulation panel as generally shown in FIG. 1 of the patent. Each of the layers 152 of vacuum insulation panels has a thickness of about ½ inch, and the layers are separated by a sheet 158 of expanded polystyrene foam and having a thickness of about ¼ inch. The layers 152 of vacuum insulation panels 155 are protected by and sandwiched between two outer sheets 162 of extruded corrugated plastic sold under the trademark "CoruPlast". All of the assembled layers 152 and sheets 158 and 162 are wrapped with a flexible film 164 of fire retardant plastics material.

Figure 16:
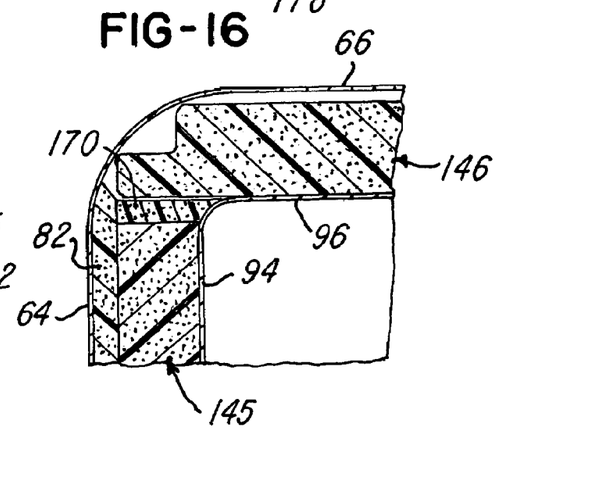
FIG. 16 is a fragmentary corner section of the shell sub-assembly, taken generally on the line 16-16 of FIG. 6.

The thermal insulation panel assemblies 145-148 are illustrated in the partial section views of FIGS. 10-16 as a one-piece insulation panel for simplification, but it is to be understood that each of the panels 145-148 is constructed substantially as described above in connection with FIGS. 8 and 9. As shown in FIG. 16, a set of fiber reinforced ribs 170 are molded as an integral part of the inner shell 56 along the top and bottom and function as rigid spacers between the inner and outer shells. As also shown in FIGS. 5, 10 and 13-15, the inner fiber reinforced skin 42 of the inner shell 56 is molded with an outwardly projecting return flange portion 172 which extends around the front end of the inner shell 56 and has a U-shaped cross-sectional configuration as shown in FIGS. 10 and 13-15. As shown in FIGS. 12 & 16, the insulation cassettes 145 and 146 have partial insulation panel extensions which project into the corner spaces between the shells. Additionally, similar insulation extensions project into sections where closed cell PVC expanded foam has been removed to reduce the heat shunts. This facilitates the connection of the insulation cassettes to each other, improving overall insulation coverage and reducing heat leaks. Closed cell PVC expanded foam 174 fills the space between the return flange 172 and the front edges of the insulation panels 145-147 and may be used in other voids within the container 25.

As also shown in FIGS. 10 and 13-15, the return front flange 172 of the inner shell 56 is attached or bonded to the forward end skin portion of the outer shell 54 by strips 176 of adhesive. Also shown in FIG. 5, a rectangular trim frame 180 is molded of a plastics material such as ABS and has an L-shaped cross sectional configuration. The frame 180 defines the front opening for the cargo container chamber 125 and is attached or bonded to the fiber reinforced skin of the inner shell 56 by strips 184 and 186 of adhesive. The front end portions of the skin of the inner shell 56 may also be provided with interruptions to form thermal breaks for eliminating heat transfer through the skin.

Figure 7:
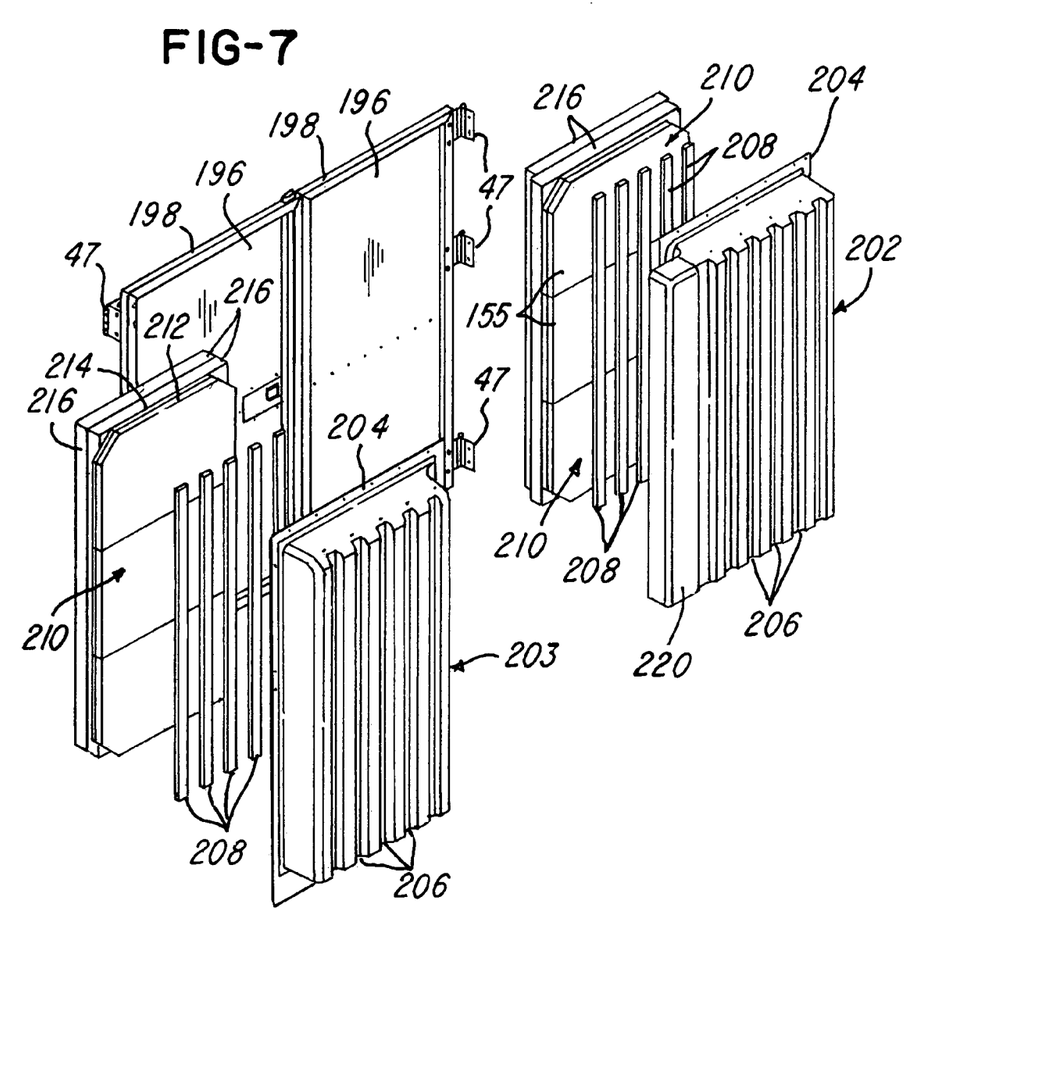
FIG. 7 is an exploded perspective view of the door assemblies shown in FIGS. 1 and 2.

Referring to FIG. 7, each of the door assemblies 44 and 46 includes an outer aluminum sheet or panel 196 secured to a rectangular tubular aluminum frame 198 to which the hinges 47 are secured. The inner surfaces of the door assemblies 44 and 46 are formed by panels 202 and 203, respectively, which are vacuum formed of a plastics material such as ABS and include an outwardly projecting peripheral flange 204 which is attached to the frame 198 of the door assembly by peripherally spaced screws. Each of the panels 202 and 203 is formed with parallel spaced vertical channels 206, and a series of expanded foam strips 208 are attached to the inner surface of the panel between the channels 206 to provide a flush surface. Each of the panels 202 and 203 also encloses an insulation cassette 210 which is constructed substantially the same as the construction of the insulation cassettes 145-148 described above in connection with FIGS. 8-9. That is, each of the insulation cassettes 210 includes two layers 212 of vacuum insulation panels 155 and the layers are separated by an expanded polystyrene foam sheet 214. Two panels 216 of expanded polystyrene foam are also located between the cassette 210 and the aluminum panel 196.

Figure 11:
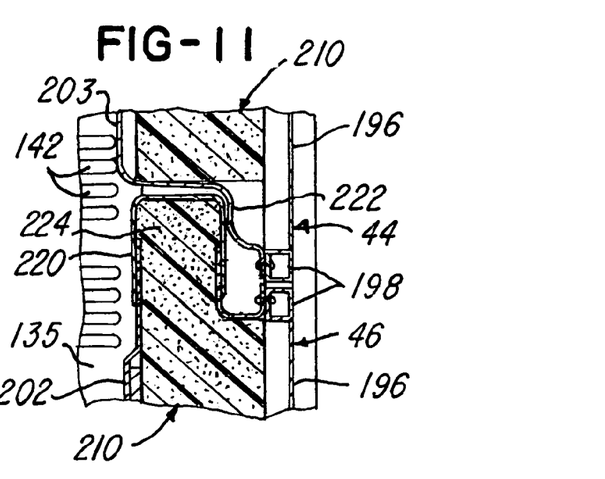
FIG. 11 is a fragmentary section of the overlapping closed door assemblies, taken generally on the line 11-11 of FIG. 1.

As shown in FIGS. 7 and 11, the left hand door assembly 46 includes an extension channel 220 which is vacuum formed from a sheet of plastics material such as ABS and is attached to the inner vacuum formed panel 202 of the door assembly. As shown in FIG. 11, the extension channel 220 overlaps a step portion 222 of the panel 203 of the right hand door assembly 44. The extension channel 220 is filled by a lateral extension 224 of the inner layer 152 of the vacuum insulation panels 155 of the corresponding insulation cassette 210. The cassettes cooperate with the foam boards 216 to provide substantial thermal insulation for the door assemblies 44 and 46. As shown in FIG. 4, the channels 206 of the door panels 202 form air flow passages extending vertically directly above the slots 142 within the aluminum floor panel 135. As shown in FIG. 1, a releasable latch mechanism 225 connects the door assemblies.

Referring to FIGS. 3 and 4, the composite panel 114 between the rear wall 97 of the inner shell 56 and the cold wall panel 120, encloses an evaporator assembly 230 of a refrigeration system and also encloses an electrical heating coil or element 232. The impellers or fans of two blowers 235 operate to pull the air upwardly within the channel 116 and pass the heating element 232 and through the evaporator assembly 230. Insulation strips 236 block air flow outside of passage 116. The blowers force the cooled or heated air through an opening or space at the top of the portion 120 and forwardly along the top wall 96 of the inner shell 56 and within the chamber 125 to the front door assemblies 44 and 46 where the air flows downwardly along the inner surfaces of the door panels 202 and then through the slots 142 within the floor panel 135. The air then flows rearwardly within the passages 138 below the floor panel and back into the bottom opening of the air flow passage 116. In this manner, air is continuously circulated around the payload or cargo within the chamber 125. In the event the cargo is tight against the inner surfaces of the door panels 202, the channels 206 provide air flow passages so that the air flow continues to flow downwardly along the door assemblies and into the slots 142 within the floor panel. In a preferred embodiment, a low power fan may be used to stir the air in the chamber when the main blowers 235 are not operating.

Referring again to FIGS. 3 and 4, the upper wall of the rectangular rear projection or extension 74 molded as an integral part of the composite outer shell 54 supports a motor driven refrigeration compressor 240 and condenser 242 having a housing supporting fans 244. The compressor and condenser are connected to the evaporator 230 by lines (not shown) extending through aligned holes within the rear wall 72 of the outer shell 54, the insulation cassette 148 and the rear wall 97 of the inner shell 56. The bottom wall of the extension 74 supports rechargeable storage batteries 250 which provide an output of 12 or 24 volts DC to operate the refrigeration compressor 240, the heater element 232 and the blower fans 235. Tie down straps 252 and bolts 253 secure the batteries positively to the bottom wall of the extension 74 of the outer shell 54. As shown in FIG. 3, a set of upper and lower rectangular air vents 256 are provided in the rear compartment or extension 36 of the outer housing 28 to provide convection ventilation within the housing portion. As shown in FIGS. 1 and 2, a side wall of the housing extension 36 supports an exposed door covered control panel 260 of a controller 262 (FIG. 4), and the housing extension 36 also encloses a battery charger 264 and a dual voltage connector 266 for the battery charger for receiving an external power supply of 110 volts or 240 volts AC. The control panel also encloses a universal AC voltage (90-280 VAC, 46-63 Hz) battery charger connector and a 12-28 V external DC power connector. The battery charger 264 is mounted on the side wall of the rectangular projection 74 and is connected to the universal AC voltage connector. The motor driven compressor 240 is mounted on the upper wall of the rectangular projection 74 and is connected to the internal and external DC power source.

The operation of the refrigeration compressor 240 or the heating element 232 and the air circulating blowers 235 is controlled through the controller 262 by a set of temperature sensing thermistors 272 (FIG. 3) located in each of the eight corners of the cargo chamber 125 and at the front center of the floor panel 135. A more detailed description of the operation and control of the heating and cooling system is set forth in above mentioned published U.S. patent application Ser. No. 2004/0226309, the disclosure of which is incorporated herein by reference.

From the drawings and the above description, it is apparent that a cargo container constructed and assembled in accordance with the invention provides desirable features and advantages. For example, the construction of the cargo container 25 with the resin impregnated fiber reinforced walls of the outer shell 54 and inner shell 56 with the thermal insulation cassettes 145-148 confined between the composite walls provides a very desirable high insulation value, for example, an R value of over 50. As a result, temperature sensitive cargo may be maintained at a substantially constant temperature for an extended period of time with minimum energy consumption from the batteries 250 to operate the refrigeration compressor 240 or the electrical heating element 232. For example, if a temperature in the cargo chamber 125 is selected between minus 20° C. and plus 4° C., it is possible to maintain the temperature within plus or minus 1° C. for up to 72 hours without using an external power source. This permits temperature sensitive cargo to be delivered practically anywhere in the world by aircraft while maintaining a substantially constant temperature. Furthermore, the fiber reinforced composite walls of the inner and outer shells and the fiber reinforced core panels within the walls provide substantial impact protection for the vacuum insulated panels 155 while minimizing the weight of the wall panels. It is also within the scope of the invention to increase the thickness and strength of the fiber reinforced wall panels of the outer shell and eliminate the outer aluminum can or housing 28, thereby reducing the overall weight and production cost of the cargo container.

Another advantage is provided by the construction and assembly of the thermal insulation cartridges or cassettes 145-148 and 210 with the joints of the vacuum insulation panels 155 on one side of the foam sheet 158 being offset and crossing the joints of the thermal insulation panels 155 on the opposite side of the sheet 158. As a result, the transfer of heat between the vacuum insulation panels is minimized or substantially eliminated, thereby further increasing the resistance to heat transfer through the wall panels. The circulation of the air within the cargo chamber 125 also helps to maintain a substantially constant temperature within the chamber. For example, cold air produced by the evaporator 230 is forced forwardly along the top wall 96 of the inner shell 56 and downwardly along the inside surface of the front door assemblies, through the slots 142 and then rearwardly within the passages 138 between the floor channels 130 and under the floor plate 135 for return to the lower open end of the evaporator panel 114. As mentioned above, the channels 206 within the inner door panels 202 assure that the downward flow of air cannot be blocked by cargo items within the chamber 125.

While the method of construction and form of cargo container herein described constitute a preferred embodiment of the invention, it is to be understood that the invention is not limited to the precise method and form of container described, and that changes may be made therein without departing from the scope and spirit of the invention as defined in the appended claims.

What is claimed is:

1. A cargo container assembly adapted for transporting a temperature sensitive cargo supported by a pallet, said assembly comprising an outer housing including opposite side walls, a bottom wall, a top wall and a rear wall, said housing having a front opening and a moveable door assembly connected to said housing for closing said front opening, a box-like composite outer shell within said housing and having side, top and bottom walls of resin impregnated fibers and disposed adjacent the corresponding said walls of said housing, a box-like composite inner shell within said outer shell and having side, top and bottom walls disposed inwardly from the corresponding said walls of said outer shell and defining a cargo receiving chamber, vacuum insulated panel assemblies confined between the corresponding said side, top and bottom walls of said inner and outer shells, and a refrigeration system connected to cool said chamber.

2. A cargo container assembly as defined in claim 1 wherein said vacuum insulated panel assemblies comprise substantially flat insulation layers each having a plurality of vacuum insulated panels, and each of said panels including a core of porous material confined within an evacuated sealed bag of flexible gas impermeable film.

3. A cargo container assembly as defined in claim 2 wherein said layers of vacuum insulated panels are separated by an insulation panel, and said layers and insulation panel are surrounded by a flexible film of plastics material to form a vacuum insulated cassette.

4. A cargo container assembly as defined in claim 3 wherein said layers of vacuum insulated panels and said insulation panel of each cassette are confined between protective plastic panels.

5. A cargo container assembly as defined in claim 2 wherein corresponding said side, top and bottom walls of said inner and outer shells are separated by said vacuum insulated panel assemblies having overlapping corner portions.

6. A cargo container assembly as defined in claim 2 wherein said vacuum insulated panels in one said layer have abutting joints crossing abutting joints of said vacuum insulated panels in a second said layer.

7. A cargo container assembly as defined in claim 1 wherein said walls of said outer shell comprise resin impregnated fibrous inner and outer skins bonded to a core of low density cellular material with resin impregnated reinforcing fibers extending through said core and connecting said skins.

8. A cargo container assembly as defined in claim 1 wherein at least some said walls of both of said inner and outer shells comprise resin impregnated fibrous inner and outer skins bonded to a core of low density cellular material having resin impregnated reinforcing fibers extending through said core and connected to said skins.

9. A cargo container assembly as defined in claim 1 wherein said outer shell includes a rear wall integral with said side wall, top and bottom walls of said outer shell, one of said walls including a projecting and generally rectangular tubular support integral with said one wall, and the corresponding said wall of said outer housing includes a projecting portion enclosing said tubular support of said outer shell.

10. A cargo container assembly as defined in claim 9 and including a refrigeration compressor and a set of storage batteries mounted on said tubular support of said outer shell.

11. A cargo container assembly as defined in claim 1 wherein each of said inner shell and said outer shell has integrally connected side, top, bottom and rear walls to form a one-piece unit, an insulation cassette between corresponding said walls, and each said cassette including a plurality of insulation layers each having a plurality of vacuum insulated panels each including a core of porous material confined within an evacuated sealed bag of flexible gas impermeable film.

12. A cargo container assembly as defined in claim 1 wherein said bottom wall of said inner shell includes a plurality of parallel spaced channels defining air flow passages therebetween, and a rigid floor panel mounted on said channels.

13. A cargo container assembly as defined in claim 12 wherein said floor panel includes a plurality of laterally spaced openings adjacent said door assembly and providing for air flow through said passages from said cargo receiving chamber.

14. A cargo container assembly as defined in claim 1 wherein said door assembly comprises a rigid outer door panel, a formed sheet of plastics material connected to said door panel and defining a space therebetween, a vacuum insulated panel assembly disposed between said sheet of plastics material and said outer door panel, and said vacuum insulated panel assembly comprising parallel layers each having a plurality of vacuum insulated panels each including a core of porous material confined within a sealed bag of flexible gas impermeable film.

15. A cargo container assembly as defined in claim 14 wherein said formed sheet of plastics material comprises a plurality of parallel spaced and generally vertical integral ribs defining air flow passages therebetween.

16. A cargo container assembly as defined in claim 15 and including a plurality of strips of plastics foam material within said integral ribs adjacent said vacuum insulated panel assembly.

17. A cargo container assembly as defined in claim 14 and including a second said door assembly, and said door assemblies having overlapping insulated center portions.

18. A cargo container assembly as defined in claim 1 and including a set of fiber reinforced spacer ribs disposed between said inner and outer shells to protect said vacuum insulated panel assemblies.

19. A cargo container assembly adapted for transporting a temperature sensitive cargo supported by a pallet, said assembly comprising a box-like composite outer shell having side, top and bottom walls of resin impregnated fibers and having a front opening and a moveable door assembly for closing said front opening, a box-like composite inner shell within said outer shell and having side, top and bottom walls disposed inwardly from the corresponding said walls of said outer shell and defining a cargo receiving chamber, vacuum insulated panel assemblies confined between the corresponding said side, top and bottom walls of said inner and outer shells, and a refrigeration system connected to cool said chamber.

20. A cargo container assembly as defined in claim 19 wherein said vacuum insulated panel assemblies comprise parallel substantially flat insulation layers each having a plurality of vacuum insulated panels, and each of said panels including a core of porous material confined within an evacuated sealed bag of flexible gas impermeable film.

21. A cargo container assembly as defined in claim 20 wherein said layers of vacuum insulated panels are separated by an insulation panel, and said layers and insulation panel are surrounded by a flexible film of plastics material to form a vacuum insulated cassette.

22. A cargo container assembly as defined in claim 21 wherein said layers of vacuum insulated panels and said insulation panel of each cassette are confined between protective plastic panels with said film surrounding said plastic panels.

23. A cargo container assembly as defined in claim 20 wherein said vacuum insulated panels in one said layer have abutting joints crossing abutting joints of said vacuum insulated panels in a second said layer.

24. A cargo container assembly as defined in claim 19 wherein said walls of said outer shell comprise resin impregnated fibrous inner and outer skins bonded to a core of low density cellular material with resin impregnated reinforcing fibers extending through said core and connecting said skins.

25. A cargo container assembly as defined in claim 19 wherein at least some said walls of both of said inner and outer shells comprise resin impregnated fibrous inner and outer skins bonded to a core of low density cellular material having resin impregnated reinforcing fibers extending through said core and connected to said skins.

26. A cargo container assembly as defined in claim 19 wherein said outer shell includes a rear wall integral with said side wall, top and bottom walls of said outer shell, one of said walls including a projecting support integral with said one wall, and a housing member enclosing said tubular support of said outer shell.

27. A cargo container assembly as defined in claim 26 and including a refrigeration compressor and a set of storage batteries mounted on said projecting support of said outer shell.

28. A cargo container assembly as defined in claim 19 wherein each of said inner shell and said outer shell has integrally connected side, top, bottom and rear walls to form a one-piece unit, insulation cassettes between corresponding said walls, and each said cassette including a plurality of insulation layers each having a plurality of vacuum insulated panels each including a core of porous material confined within an evacuated sealed bag of flexible gas impermeable film.

29. A cargo container assembly as defined in claim 19 wherein said bottom wall of said inner shell includes a plurality of parallel spaced members defining air flow passages therebetween, and a rigid floor panel mounted on said spaced members.

30. A cargo container assembly as defined in claim 29 wherein said floor panel includes a plurality of laterally spaced openings adjacent said door assembly and providing for air flow through said passages from said cargo receiving chamber.

31. A cargo container assembly as defined in claim 19 wherein said door assembly comprises a rigid outer door panel, a formed sheet of plastics material connected to said door panel and defining a space therebetween, a vacuum insulated panel assembly disposed between said sheet of plastics material and said outer door panel, and said vacuum insulated panel assembly comprising parallel layers each having a plurality of vacuum insulated panels each including a core of porous material confined within a sealed bag of flexible gas impermeable film.

32. A cargo container assembly as defined in claim 31 wherein said formed sheet of plastics material comprises a plurality of parallel spaced and generally vertical integral ribs defining air flow passages therebetween.

33. A cargo container assembly as defined in claim 31 and including a second said door assembly, and said door assemblies having overlapping insulated center portions.

34. A cargo container assembly as defined in claim 19 and including a set of fiber reinforced rigid spacer ribs disposed between said inner and outer shells to protect said vacuum insulated panel assemblies.

35. A method of making a cargo container assembly adapted for transporting a temperature sensitive cargo supported by a pallet, said method comprising the steps of:
forming a box-like composite outer shell including side, top, rear and bottom walls of resin impregnated fibers and defining a front opening with a moveable door assembly for closing the front opening;
forming a box-like composite inner shell including side, top, rear and bottom walls of resin impregnated fibers and defining a cargo receiving chamber;
locating vacuum insulated panel assemblies adjacent the side, top, rear and bottom walls of the inner shell;
inserting the inner shell and vacuum insulated panel assemblies into the outer shell; and
installing a power operated refrigeration unit with an evaporator within the inner shell and connected to a motor driven compressor outside of the outer shell.

36. A method as defined in claim 35 including the steps of:
forming each of the vacuum insulated panel assemblies with substantially flat and parallel insulation layers each having a plurality of vacuum insulated panels including a core of porous material confined within an evacuated sealed bag of flexible gas impermeable film.

37. A method as defined in claim 36 including the step of:
surrounding the layers of vacuum insulated panels and the insulation panel of each of the vacuum insulated panel assemblies with a flexible film of plastics material to form a vacuum insulated cassette.

38. A method as defined in claim 36 including the steps of:
positioning an insulation panel between the layers of each vacuum insulated cassette; and
confining the layers of vacuum insulated panels and the insulation panel of each cassette between parallel spaced protective plastic panels.

39. A method as defined in claim 36 including the step of:
arranging the vacuum insulated panels in one layer with abutting joints crossing abutting joints of the vacuum insulated panels in a second layer.

40. A method as defined in claim 35 including the step of:
forming the walls of the outer shell with resin impregnated fibrous inner and outer skins bonded to a core of low density cellular material with resin impregnated reinforcing fibers extending through the core and connecting the skins.

41. A method as defined in claim 35 including the step of overlapping edge portions of the vacuum insulated panel assemblies within the side, top and bottom walls.

* * * * *